(12) United States Patent
Yamagishi et al.

(10) Patent No.: US 12,032,277 B2
(45) Date of Patent: Jul. 9, 2024

(54) PHOSPHOR WHEEL, LIGHT SOURCE DEVICE, AND PROJECTION IMAGE DISPLAY DEVICE

(71) Applicant: Panasonic Intellectual Property Management Co., Ltd., Osaka (JP)

(72) Inventors: Shigekazu Yamagishi, Osaka (JP); Yusaku Nishikawa, Osaka (JP); Yoshiki Tanaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/864,897

(22) Filed: Jul. 14, 2022

(65) Prior Publication Data

US 2023/0023296 A1     Jan. 26, 2023

(30) Foreign Application Priority Data

Jul. 21, 2021  (JP) .................................. 2021-120617

(51) Int. Cl.
 *G03B 21/20*  (2006.01)
 *G02B 26/00*  (2006.01)

(52) U.S. Cl.
 CPC ......... *G03B 21/204* (2013.01); *G02B 26/008* (2013.01); *G03B 21/2066* (2013.01)

(58) Field of Classification Search
 CPC .............. G03B 21/204; G03B 21/2066; G03B 21/2013; G03B 21/16; G02B 26/008
 See application file for complete search history.

(56) References Cited

U.S. PATENT DOCUMENTS

| | | | | |
|---|---|---|---|---|
| 10,684,539 | B2* | 6/2020 | Yamagishi | ......... G03B 21/2066 |
| 2017/0175989 | A1* | 6/2017 | Yamagishi | ............ F21V 29/502 |
| 2017/0192346 | A1* | 7/2017 | Chikayama | .......... G02B 26/008 |
| 2017/0205692 | A1* | 7/2017 | Aoki | ...................... G03B 21/16 |
| 2017/0261844 | A1 | 9/2017 | Kitade et al. | |
| 2017/0353701 | A1* | 12/2017 | Egawa | ................. H04N 9/3105 |
| 2018/0031957 | A1* | 2/2018 | Egawa | ................. H04N 9/3158 |
| 2018/0095349 | A1* | 4/2018 | Egawa | ................. H04N 9/3161 |

(Continued)

FOREIGN PATENT DOCUMENTS

| | | |
|---|---|---|
| JP | 2001-340989 | 12/2001 |
| JP | 2013-210439 | 10/2013 |

(Continued)

*Primary Examiner* — Magda Cruz
(74) *Attorney, Agent, or Firm* — Wenderoth, Lind & Ponack, L.L.P.

(57) ABSTRACT

A phosphor wheel according to the present disclosure includes: a first substrate having a first main surface and a second main surface opposite to the first main surface, the first substrate including a metal material; a phosphor ring provided on the first main surface of the first substrate; a second substrate having a third main surface and a fourth main surface being opposite to the third main surface, the second substrate including a metal material; a plurality of heat dissipation fins disposed on the fourth main surface of the second substrate; and a motor mounted on the first substrate. The second main surface of the first substrate and the third main surface of the second substrate are joined by brazing. The motor is mounted on the first substrate with a gap interposed between the motor and the second substrate.

25 Claims, 11 Drawing Sheets

(56) References Cited

U.S. PATENT DOCUMENTS

| | | |
|---|---|---|
| 2018/0231880 A1 | 8/2018 | Masuda |
| 2020/0089092 A1* | 3/2020 | Yamagishi ............ G03B 21/204 |
| 2020/0310233 A1* | 10/2020 | Kadotani ........... H05K 7/20327 |
| 2022/0390822 A1* | 12/2022 | Tabayashi ............. G03B 21/204 |

FOREIGN PATENT DOCUMENTS

| | | |
|---|---|---|
| JP | 2017-72670 | 4/2017 |
| JP | 2017-72673 | 4/2017 |
| JP | 2018-4668 | 1/2018 |
| JP | 2018-132549 | 8/2018 |
| JP | 6745486 | 8/2020 |

* cited by examiner

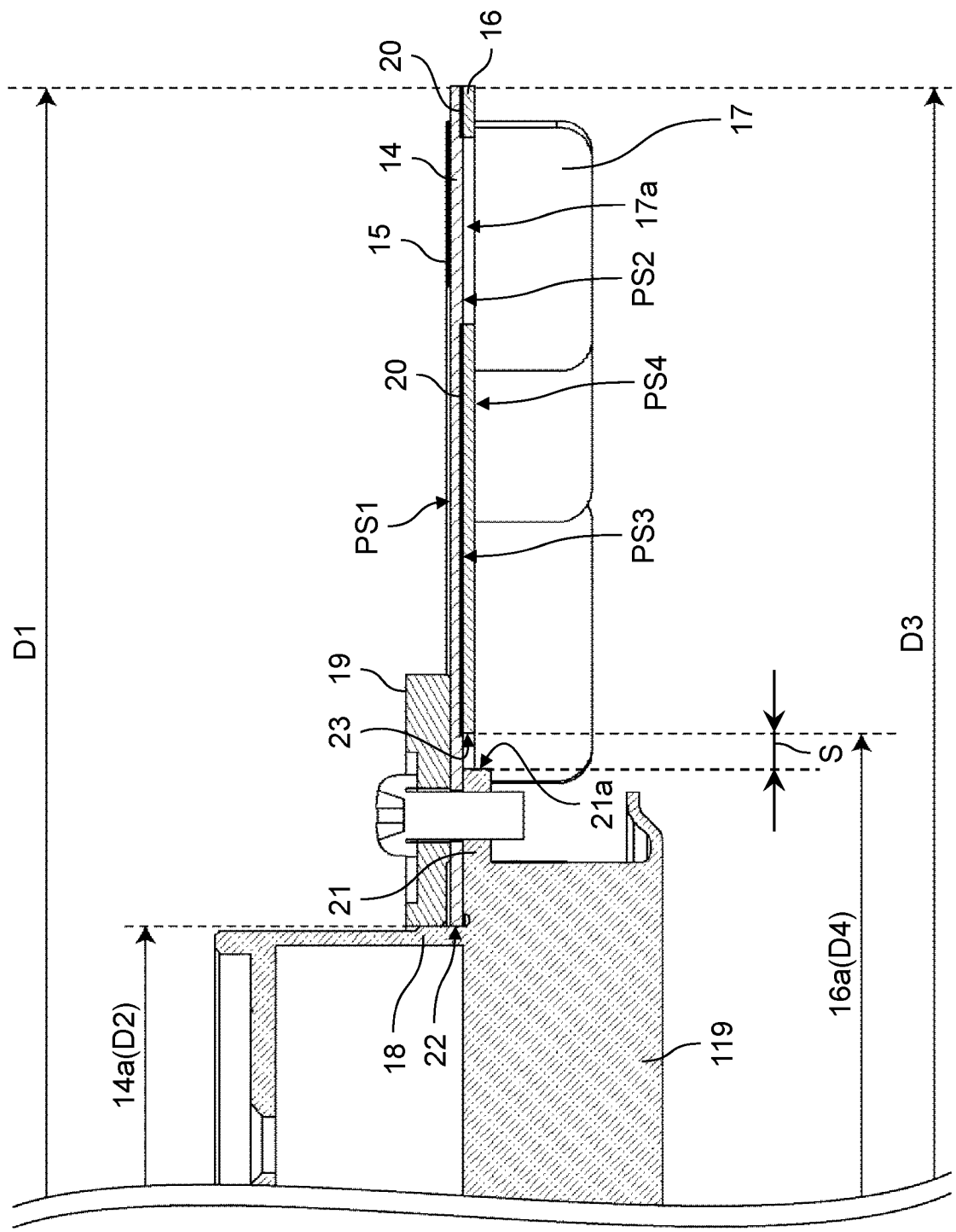

PHOSPHOR WHEEL, LIGHT SOURCE DEVICE, AND PROJECTION IMAGE DISPLAY DEVICE

BACKGROUND

1. Technical Field

The present disclosure relates to a phosphor wheel, a light source device, and a projection image display device.

2. Description of the Related Art

Japanese Patent No. 6745486 discloses a phosphor wheel that effectively cools a phosphor layer. The phosphor wheel described in Japanese Patent No. 6745486 includes a substrate having a first main surface, a second main surface, and an open part, a phosphor layer provided on the first main surface, and a fin provided on the second main surface. The fin is nearer a center of the substrate than the phosphor layer is, and the open part is located between the phosphor layer and the fin in a radial direction of the substrate.

Unexamined Japanese Patent Publication No. 2017-72673 discloses a light source device including a phosphor device. The light source device described in Unexamined Japanese Patent Publication No. 2017-72673 includes an excitation light source, an inorganic binder phosphor layer, and a thin film. The excitation light source emits excitation light in a predetermined wavelength band. The inorganic binder phosphor layer emits fluorescent light upon irradiation with the excitation light. The thin film is disposed on the inorganic binder phosphor layer and reflects light having a desired wavelength.

SUMMARY

However, the structures disclosed in Japanese Patent No. 6745486 and Unexamined Japanese Patent Publication No. 2017-72673 still have room for improvement in terms of improving cooling performance inexpensively.

The present disclosure aims to provide a phosphor wheel, a light source device, and a projection image display device capable of improving cooling performance inexpensively.

A phosphor wheel according to one aspect of the present disclosure includes: a first substrate having a first main surface and a second main surface opposite to the first main surface, the first substrate including a metal material; a phosphor ring provided on the first main surface of the first substrate; a second substrate having a third main surface and a fourth main surface the fourth main surface being opposite to the third main surface, the third main surface being located between the second main surface and the fourth main surface, the second substrate including a metal material; a plurality of heat dissipation fins disposed on the fourth main surface of the second substrate; and a motor mounted on the first substrate. The second main surface of the first substrate and the third main surface of the second substrate are joined by brazing. The first substrate has a first hole into which the motor is fitted, the first hole being provided at a center of the first substrate when viewed from a first main surface side. The second substrate has a second hole larger than the first hole, the second hole being provided at a center of the second substrate when viewed from a fourth main surface side. The motor is located inside the second hole, and is mounted on the first substrate with a gap interposed between the motor and the second substrate.

A light source device according to one aspect of the present disclosure includes the phosphor wheel according to the above aspect.

A projection image display device according to one aspect of the present disclosure includes the light source device according to the above aspect.

The present disclosure can provide a phosphor wheel, a light source device, and a projection image display device capable of improving cooling performance inexpensively.

BRIEF DESCRIPTION OF THE DRAWINGS

FIG. 6 is a schematic partial sectional view of the phosphor wheel;

Figure 1:
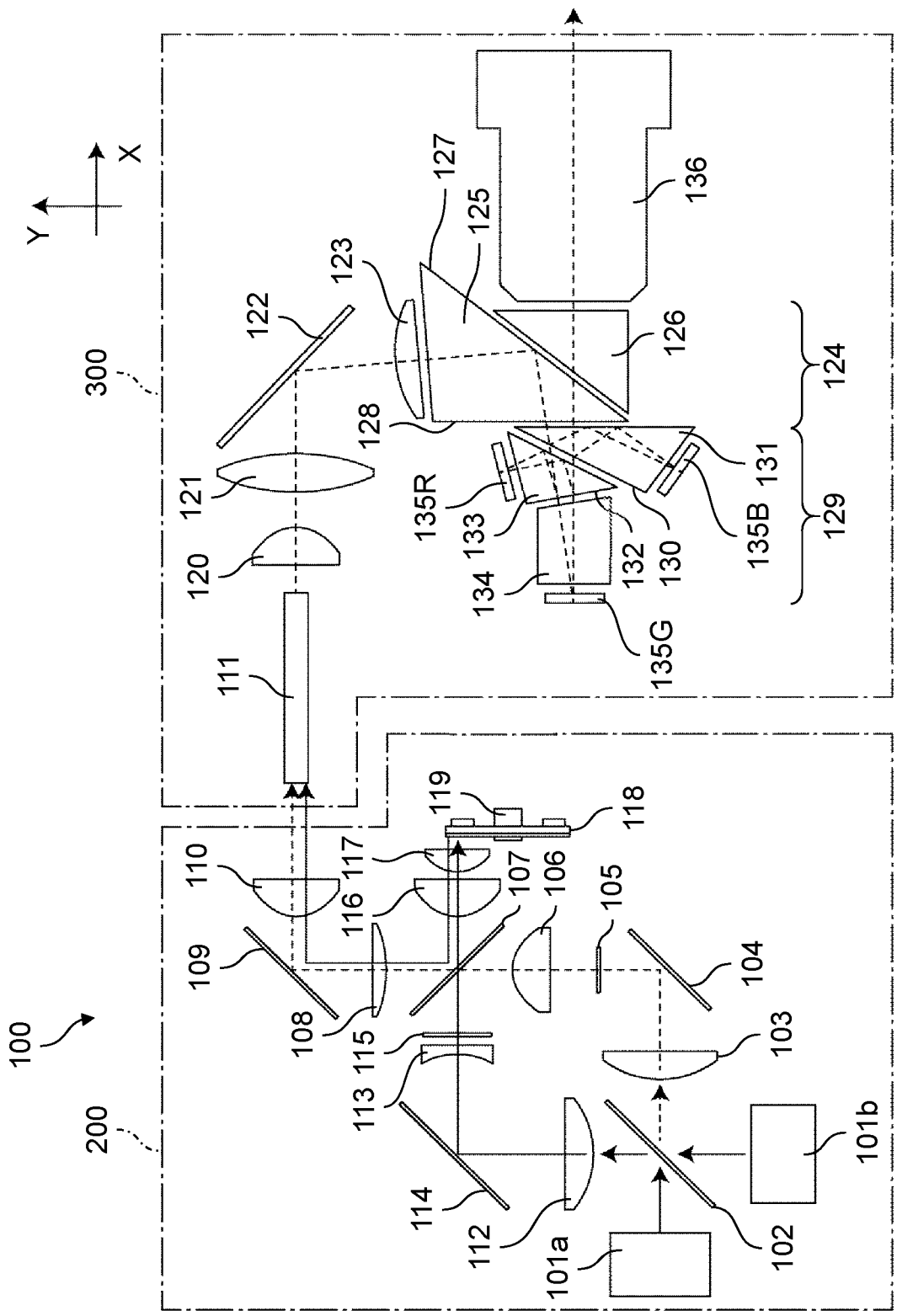
FIG. 1 is a schematic configuration diagram of an example of a projection image display device according to a first exemplary embodiment.

DETAILED DESCRIPTION (Underlying Knowledge Forming Basis of Present Disclosure)

A light source of a projection image display device is shifting from a conventional discharge lamp to a light-emitting diode (LED) or a laser in terms of lifetime and environmental problems. The LED has not only a large light emission angle, but also a wider light distribution as a light emitting unit becomes larger. For this reason, the projection image display device has limitations on a size of the light emitting unit and a light distribution angle, and the LED cannot achieve a high light output of the projection image display device. Meanwhile, the laser has a narrow light distribution, and a combination of multiple lasers can achieve high output power. For this reason, the laser is mainly used as the light source of the projection image display device. In addition, when a high-output laser in a blue wavelength range is used as a light source, a phosphor that emits yellow light using a laser as excitation light is used in order to obtain white light.

In the phosphor, heat is generated by the energy of the excitation light. This heat causes thermal quenching which refers to the reduction in efficiency of the phosphor due to increase in the temperature of the phosphor. In order to solve this problem, an annular phosphor is provided on a metal disk, and the temperature of the phosphor is reduced by rotating the metal disk.

Meanwhile, a high-output laser is required for achieving higher brightness. Accordingly, a structure for improving cooling performance for cooling a phosphor has been studied. For example, an attempt is made to improve cooling performance by introducing a cooling fin into a metal disk provided with a phosphor or by integrating a skived fin with the metal disk.

In the phosphor wheel described in Japanese Patent No. 6745486, the phosphor layer is provided on the first main surface of the substrate, and a fan member is attached to the second main surface of the substrate. The fan member is a separate member from the substrate, and has a plurality of fins. The fan member is rotated integrally with the substrate by the motor, and each of the plurality of fins sends air to the outside of the fin (centrifugal direction) with the rotation of the substrate. The air generated outward by the plurality of fins flows toward the phosphor layer through a plurality of openings penetrating the first main surface and the second main surface of the substrate, and cools the phosphor layer. However, the phosphor wheel described in Japanese Patent No. 6745486 still has room for improvement in terms of improving cooling performance.

In the light source device described in Unexamined Japanese Patent Publication No. 2017-72673, a heat radiator, a heat sink, or the like is used as a cooling unit for dissipating heat of the phosphor layer. However, the light source device described in Unexamined Japanese Patent Publication No. 2017-72673 needs, for example, a motor having a sufficient driving force, because the weight of the light source device increases as a result of attaching the heat radiator and the heat sink thereto. This causes problems such as an increase in cost and/or generation of noise resulting from an increase in size of a component such as a motor. In addition, when a heat conductive material such as grease is applied between the substrate and the heat sink, the grease is softened and scattered due to use at a high temperature and high-speed rotation, and thus reliability cannot be guaranteed.

Therefore, in order to solve these problems, the inventors of the present disclosure have studied a phosphor wheel capable of improving cooling performance inexpensively. Then, the inventors of the present disclosure have found a phosphor wheel in which a first substrate provided with a phosphor ring and a second substrate provided with a plurality of heat dissipation fins are joined by brazing, and have completed the present disclosure.

Hereinafter, an exemplary embodiment will be described in detail with appropriate reference to the accompanying drawings. However, unnecessarily detailed descriptions may be omitted. For example, detailed description on already known matters and duplicated description on substantially identical configurations may be omitted. This is to prevent the following description from being unnecessarily redundant and to enable those skilled in the art to easily understand the present disclosure.

Note that, the accompanying drawings and the description below are provided to enable those skilled in the art to fully understand the present disclosure, and are not intended to limit the subject matters described in the claims.

First Exemplary Embodiment

[1-1. Configuration of Projection Image Display Device]

FIG. 1 is a schematic configuration diagram illustrating an example of projection image display device 100 according to a first exemplary embodiment. As illustrated in FIG. 1, projection image display device 100 includes light source device 200 and illumination optical system 300.

In the present exemplary embodiment, light source device 200 includes laser diode units 101a, 101b, partially reflective mirror 102, lens 103, 108, 110, 112, 113, mirror 104, 109, 114, diffuser plate 105, 115, condenser lens 106, 116, 117, dichroic mirror 107, phosphor wheel 118, and motor 119. Illumination optical system 300 includes rod integrator 111, relay lens 120, 121, mirror 122, field lens 123, total reflection prism 124, color prism unit 129, image forming elements (digital micromirror devices (DMDs)) 135R, 135G, 135B, and projection lens 136. Note that, the configurations of light source device 200 and illumination optical system 300 illustrated herein are merely examples, and are not limited to these elements.

First, light source device 200 will be described.

Figure 2A:
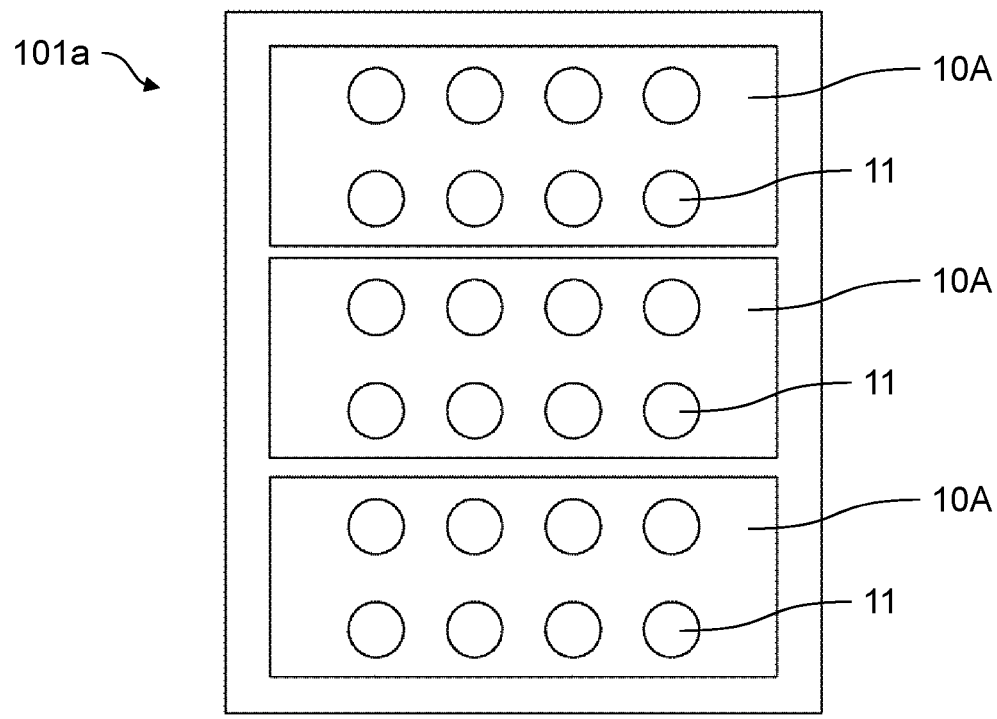
FIG. 2A is a schematic view of an example of a laser diode unit.
Figure 2B:
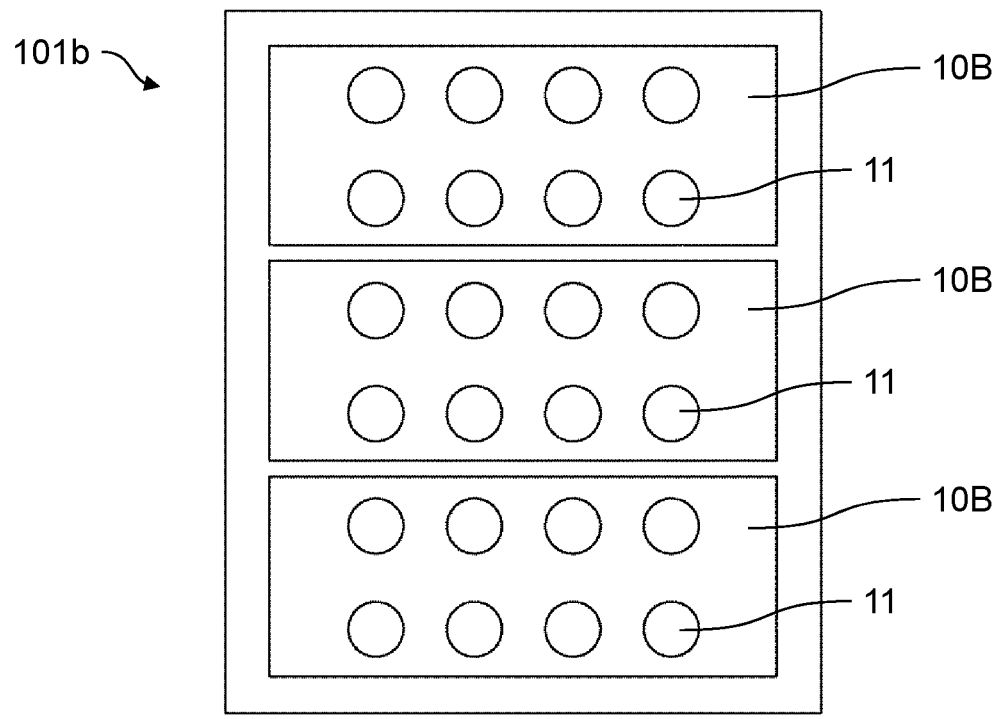
FIG. 2B is a schematic view of an example of a laser diode unit.

In light source device 200, each of laser diode units 101a, 101b is used as a light source. FIG. 2A is a schematic view of an example of laser diode unit 101a. FIG. 2B is a schematic view of an example of laser diode unit 101b. As illustrated in FIGS. 2A and 2B, laser diode unit 101a includes a plurality of laser light sources 10A, and laser diode unit 101b includes a plurality of laser light sources 10B. Each of the plurality of laser light sources 10A, 10B includes a plurality of blue laser diodes (not illustrated) and a plurality of collimating lenses 11 disposed on an emission surface side of the plurality of blue laser diodes. The plurality of collimating lenses 11 are disposed on optical axes of beams of light emitted from the plurality of blue laser diodes. In the present exemplary embodiment, laser diode unit 101a includes three laser light sources 10A arranged side by side, and laser diode unit 101b includes three laser light sources 10B arranged side by side.

Laser diode units 101a, 101b each emit, for example, blue light having a center wavelength of 456 nm. Light emitted from each of laser diode units 101a, 101b enters partially reflective mirror 102. Partially reflective mirror 102 is a mirror having a property of partially reflecting light of a blue wavelength by a certain amount.

Figure 3:
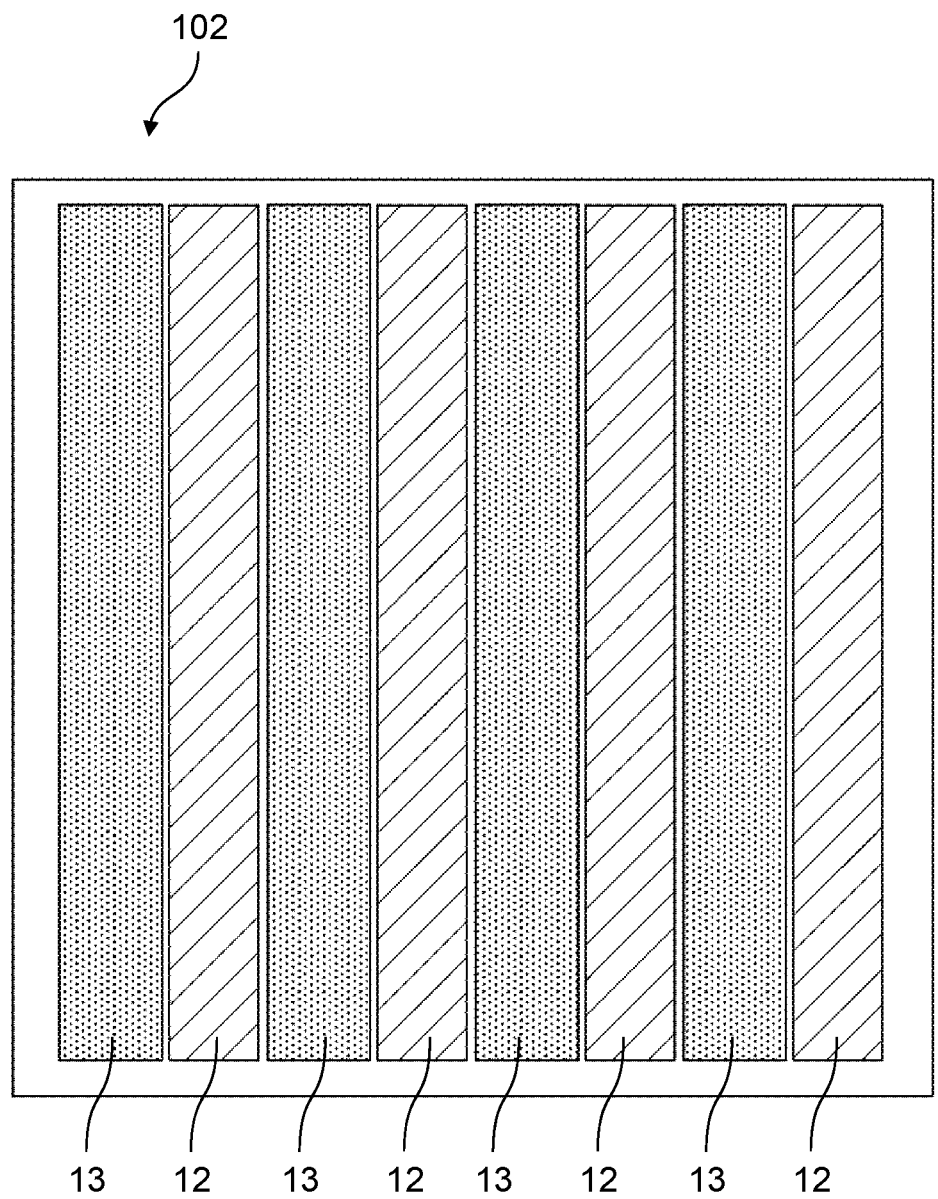
FIG. 3 is a schematic view illustrating an example of a partially reflective mirror.

FIG. 3 is a schematic view illustrating an example of partially reflective mirror 102. As illustrated in FIG. 3, partially reflective mirror 102 includes a plurality of reflectors 12 that reflect blue light and a plurality of transmission parts 13 that transmit blue light. The plurality of reflectors 12 and the plurality of transmission parts 13 each have a rectangular shape having a longitudinal direction. The plurality of reflectors 12 and the plurality of transmission parts 13 are alternately arranged. Each of the plurality of reflectors 12 has a property of reflecting light of a blue wavelength by a certain amount. That is, the plurality of reflectors 12 reflect part of incident blue light, and transmit part of the incident blue light.

Beams of blue light emitted from laser diode units 101a, 101b enter partially reflective mirror 102. Partially reflective mirror 102 selectively reflects and transmits the beams of blue light.

Figure 4:
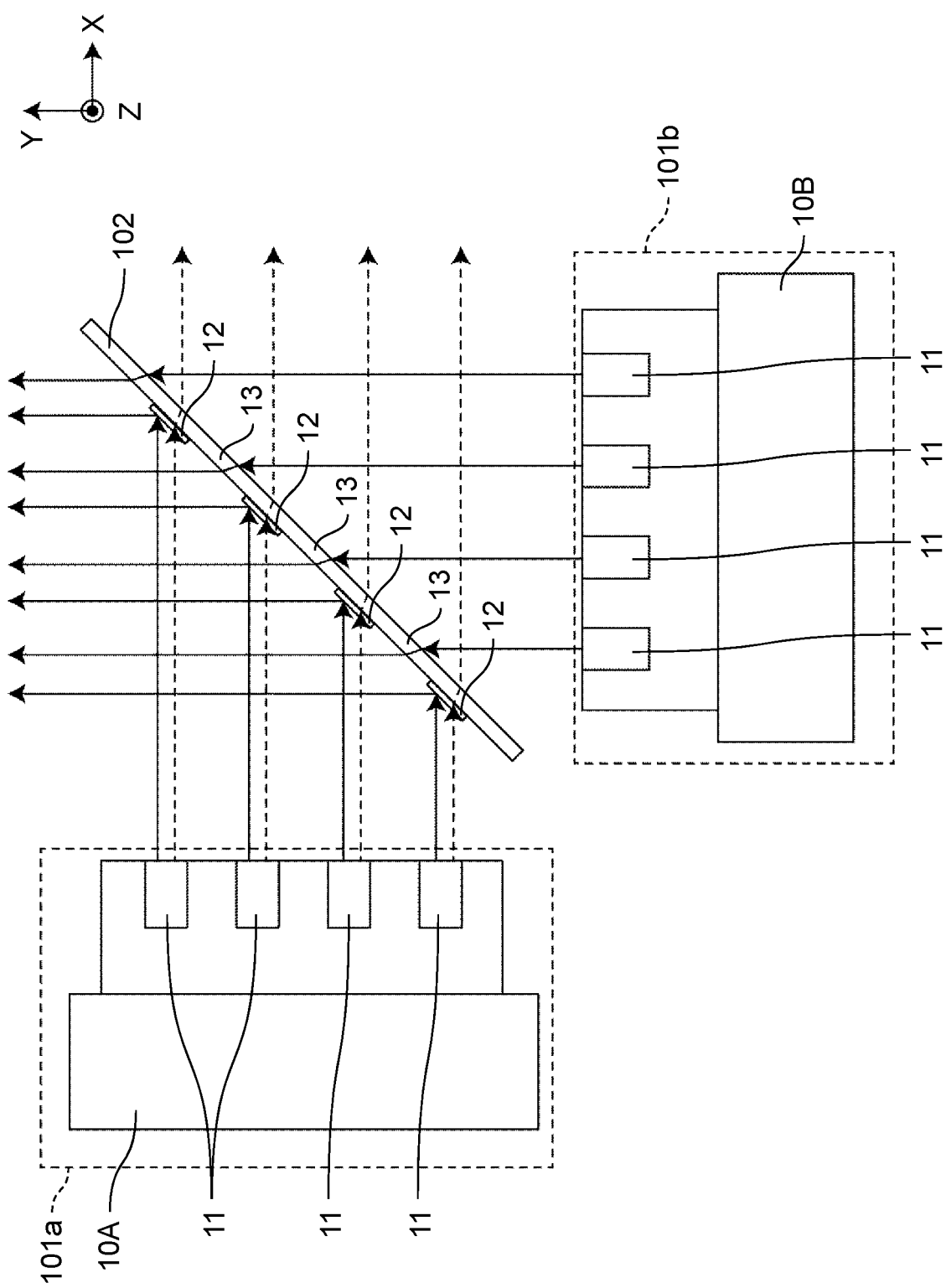
FIG. 4 is a schematic diagram for describing optical paths of beams of light emitted from the laser diode units.

FIG. 4 is a schematic diagram for describing optical paths of beams of light emitted from laser diode units 101a, 101b. As illustrated in FIG. 4, the beams of light emitted from laser diode unit 101a travel in a +X direction and enter the plurality of reflectors 12 of partially reflective mirror 102. The plurality of reflectors 12 reflect part of the beams of light emitted from laser diode unit 101a in a +Y direction, and transmit the remaining beams of light in the +X direction. The beams of light emitted from laser diode unit 101*b* travel in the +Y direction and enter the plurality of transmission parts 13 of partially reflective mirror 102. The plurality of transmission parts 13 transmit all the beams of light emitted from laser diode unit 101*b* in the +Y direction. In this manner, more light is guided in the +Y direction.

Returning to FIG. 1, blue light that exits in the +X direction in partially reflective mirror 102 is condensed by lens 103, reflected by mirror 104, and then condensed on diffuser plate 105. The blue light condensed on diffuser plate 105 enters condenser lens 106, becomes substantially parallel light, and enters dichroic mirror 107. Dichroic mirror 107 has a property of allowing blue light to pass through and reflecting light of any emission color other than the blue light. The blue light passed through dichroic mirror 107 passes through lens 108, mirror 109, and lens 110, and is condensed on an incident surface of rod integrator 111 of illumination optical system 300.

Blue light that exits in the +Y direction in partially reflective mirror 102 is converged by lens 112, 113 constituting an afocal system with mirror 114 interposed therebetween, and enters diffuser plate 115. The blue light is diffused by diffuser plate 115 and then passes through dichroic mirror 107. The blue light passed through dichroic mirror 107 passes through condenser lens 116, 117 and enters phosphor wheel 118.

Phosphor wheel 118 is provided with a phosphor layer. Phosphor wheel 118 includes motor 119. Phosphor wheel 118 is rotated by motor 119. For example, phosphor wheel 118 is applied with a YAG phosphor that is excited by blue light and emits yellow light containing green and red wavelength components. In this manner, the phosphor layer is formed. Light substantially imaged on the phosphor layer of phosphor wheel 118 is reflected as yellow light. A detailed configuration of phosphor wheel 118 will be described later.

The yellow light (fluorescent light) reflected by phosphor wheel 118 passes through condenser lens 117, 116, and enters dichroic mirror 107. The yellow light is reflected by dichroic mirror 107. Then, similarly to the blue light, the yellow light passes through lens 108, mirror 109, and lens 110, and is condensed on the incident surface of rod integrator 111 of illumination optical system 300.

In light source device 200, when the blue light and the yellow light are condensed on the incident surface of rod integrator 111, the blue light and the yellow light (fluorescent light) are superposed. As a result, white light is produced.

Next, illumination optical system 300 will be described.

Rod integrator 111 of illumination optical system 300 is made of a transparent member such as glass. Rod integrator 111 reflects incident light inside thereof a plurality of times, thereby generating light having a uniform intensity distribution. Rod integrator 111 may be a solid rod or a hollow rod whose inner wall is formed by a mirror surface.

Light (white light) that exits from rod integrator 111 passes through relay lenses 120, 121, is reflected by folding mirror 122, passes through field lens 123, and enters total reflection prism 124. Total reflection prism 124 includes first prism 125 and second prism 126. First prism 125 and second prism 126 define a gap therebetween. First prism 125 and second prism 126 each have, for example, a substantially triangular prism shape. Total reflection prism 124 totally internally reflects the incident white light and causes the white light to exit toward color prism unit 129. Specifically, the light that enters total reflection prism 124 is totally reflected by prism plane 127, passes through prism plane 128, and enters color prism unit 129.

Color prism unit 129 includes first prism 131, second prism 133, and third prism 134. First prism 131 has first dichroic mirror surface 130 having a property of reflecting blue light. Second prism 133 has second dichroic mirror surface 132 having a property of reflecting red light. First prism 131, second prism 133, and third prism 134 are bonded firmly. Image forming elements (digital micromirror devices (DMDs)) 135R, 135G, 135B are disposed on end surfaces of second prism 133, third prism 134, first prism 131, respectively. DMDs 135R, 135G, 135B each include a plurality of micromirrors two-dimensionally arranged, and each have a tilt direction controlled in two directions in accordance with an image signal from an external device. The light reflected at a tilt angle at the time of an ON signal returns to color prism unit 129 at an incident angle of 0°. The light reflected at the time of an OFF signal enters color prism unit 129 again at a large angle. DMD 135B is for blue light modulation. DMD 135R is for red light modulation. DMD 135G is for green light modulation.

Each micromirror of DMDs 135R, 135G, 135B basically corresponds to one pixel. DMDs 135R, 135G, 135B change the angles of the respective micromirrors based on various control signals, thereby switching whether to direct the light reflected by DMDs 135R, 135G, 135B to projection lens 136. Specifically, light in a white display mode in respective pixels of DMDs 135R, 135G, 135B returns to color prism unit 129 again, passes through first prism 125 and second prism 126 of total reflection prism 124, enters projection lens 136, and is applied to the screen. Thus, color display is achieved. Although details of an optical path of OFF light in DMDs 135R, 135G, 135B are omitted here, the OFF light is controlled so as not to enter projection lens 136, so that black display is performed on the screen.

[1-2. Configuration of Phosphor Wheel]

Figure 5A:
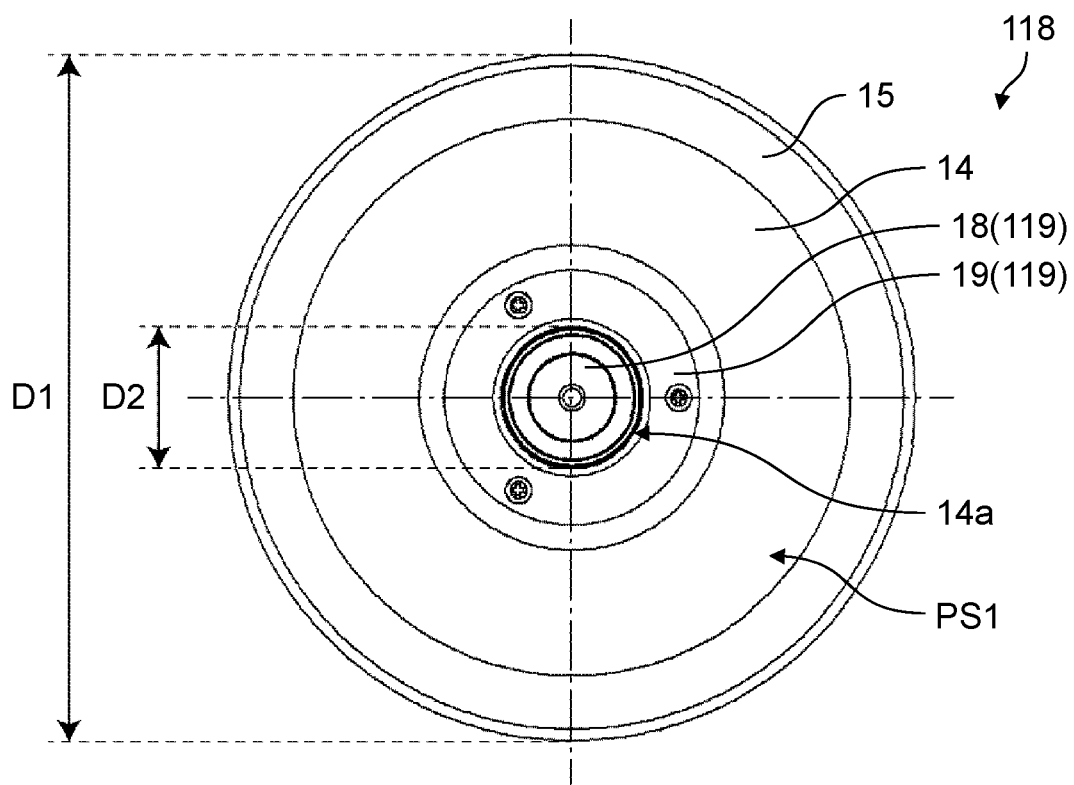
FIG. 5A is a schematic view of a phosphor wheel as viewed from a first substrate side.
Figure 5B:
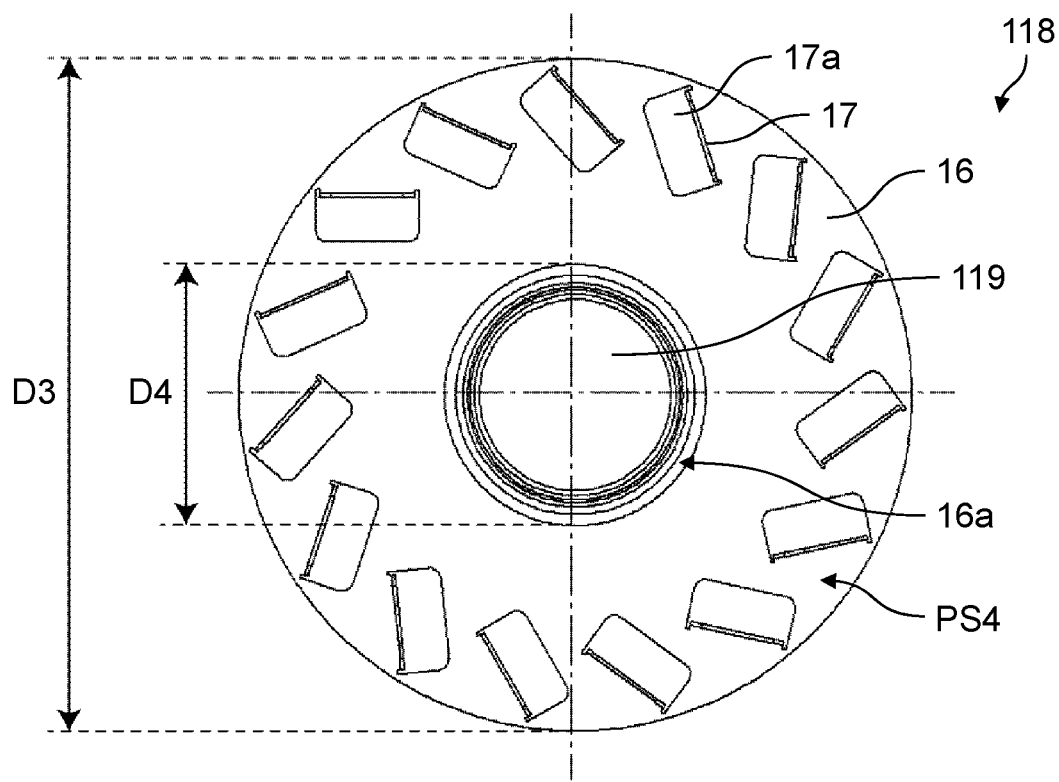
FIG. 5B is a schematic view of the phosphor wheel as viewed from a second substrate side.

FIG. 5A is a schematic view of phosphor wheel 118 as viewed from first substrate 14 side. FIG. 5B is a schematic view of phosphor wheel 118 as viewed from second substrate 16 side. FIG. 6 is a schematic partial sectional view of phosphor wheel 118. As illustrated in FIGS. 5A to 6, phosphor wheel 118 includes first substrate 14, phosphor ring 15, second substrate 16, and a plurality of heat dissipation fins 17. In phosphor wheel 118, phosphor ring 15 is provided on first substrate 14, and the plurality of heat dissipation fins 17 are provided on second substrate 16. First substrate 14 and second substrate 16 are joined by brazing.

In addition, phosphor wheel 118 includes motor 119 and is rotated by motor 119. Although the phosphor emits fluorescent light upon irradiation with the excitation light, about half of the energy of the excitation light is converted into heat at this time. In order to reduce burnout caused by rapid heat generation, phosphor wheel 118 is rotated. This reduces temperature rise and enables efficient conversion of excitation light into fluorescent light (yellow light in this example) for a long period of time, even if the excitation light is concentrated on phosphor wheel 118.

First substrate 14 has first main surface PS1 and second main surface PS2 opposite to first main surface PS1, and is made of a metal material. First substrate 14 is a metal disk having a circular shape with outer diameter D1 when viewed from first main surface PS1 side. The expression "when viewed from first main surface PS1 side" means when viewed in a thickness direction of first substrate 14, that is, in a direction from first main surface PS1 toward second main surface PS2. Specifically, the metal material constituting first substrate 14 is a metal material having excellent heat dissipation. As the metal material constituting first substrate 14, for example, an aluminum material (such as pure aluminum-based material) can be used.

When viewed from first main surface PS1 side, first substrate 14 has, at its center, first hole 14a. First hole 14a is a circular hole having diameter D2 when viewed from first main surface PS1 side. First hole 14a has a center that coincides with a center of first substrate 14. Motor 119 is fitted into first hole 14a. Motor 119 has mounting part 18. Mounting part 18 has a cylindrical shape and also functions as a rotation shaft. Mounting part 18 is inserted into first hole 14a and thus motor 119 is mounted on first substrate 14.

In addition, fixing flange 19 having an annular shape is provided on first main surface PS1 of first substrate 14. Fixing flange 19 and motor 119 are fixed with, for example, a screw. Specifically, motor 119 includes motor flange 21 disposed on second main surface PS2 of first substrate 14. First substrate 14 is held between fixing flange 19 and motor flange 21. Fixing flange 19 and first substrate 14 each have a through hole. Motor flange 21 has a screw hole. A fixing screw is passed through the through holes of fixing flange 19 and first substrate 14, and is screwed into the screw hole of motor flange 21. Thus, motor 119 is mounted on first substrate 14.

An outer periphery of mounting part 18 of motor 119, and an inner periphery of fixing flange 19 and inner periphery 22 of first substrate 14 have small mechanical tolerances and are in contact with each other substantially without a gap. Here, inner periphery 22 of first substrate 14 means an inner wall defining first hole 14a. In other words, an outer diameter of mounting part 18, and an inner diameter of fixing flange 19 and an inner diameter of first substrate 14 (diameter D2 of first hole 14a) have fitting dimensions with small mechanical tolerances.

Phosphor ring 15 is provided on first main surface PS1 of first substrate 14. For example, phosphor ring 15 is formed of a YAG phosphor that is excited by blue light and emits yellow light containing green and red wavelength components. For example, phosphor ring 15 is fixed to first substrate 14 with an adhesive containing a material (such as titanium oxide) having a reflective property. When first substrate 14 is viewed from first main surface PS1 side, phosphor ring 15 has an annular shape. When viewed from first main surface PS1 side, phosphor ring 15 has a center that substantially coincides with the center of first substrate 14. When viewed from first main surface PS1 side, phosphor ring 15 is disposed closer to the outer periphery than to the center in first substrate 14. Specifically, phosphor ring 15 is disposed along the outer periphery of first substrate 14. In the present exemplary embodiment, phosphor ring 15 is disposed slightly inside from the outer periphery of first substrate 14.

Second substrate 16 has third main surface PS3 and fourth main surface PS4 opposite to third main surface PS3, and is made of a metal material. Second substrate 16 is disposed to overlap first substrate 14. Third main surface PS3 is disposed on second main surface PS2 of first substrate 14. Second substrate 16 is a metal plate-shaped member having a circular shape with outer diameter D3 when viewed from fourth main surface PS4 side. The expression "when viewed from fourth main surface PS4 side" means when viewed in a thickness direction of second substrate 16, that is, in a direction from fourth main surface PS4 toward third main surface PS3. Specifically, second substrate 16 is a disk made of a metal material having excellent heat dissipation. Outer diameter D3 of second substrate 16 is equal to outer diameter D1 of first substrate 14.

Preferably, the metal material constituting second substrate 16 and the metal material constituting first substrate 14 are equal in thermal expansion coefficient to each other. More preferably, the metal material constituting second substrate 16 is the same as the metal material constituting first substrate 14. This configuration allows the heat of first substrate 14 to be easily transferred to second substrate 16.

When viewed from fourth main surface PS4 side, second substrate 16 has, at its center, second hole 16a. Second hole 16a is a circular hole having diameter D4 when viewed from fourth main surface PS4 side. Second hole 16a has a center that coincides with a center of second substrate 16. Diameter D4 of second hole 16a is larger than diameter D2 of first hole 14a. Furthermore, when viewed from fourth main surface PS4 side, diameter D4 of second hole 16a is larger than the outer dimension of motor 119 on third main surface PS3.

Diameter D4 of second hole 16a is larger than an outer diameter of motor flange 21 of motor 119. Thus, outer periphery 21a of motor flange 21 and inner periphery 23 of second substrate 16 are separated from each other, and second substrate 16 is not in contact with motor 119. That is, as illustrated in FIG. 6, motor 119 is located inside second hole 16a, and is mounted on first substrate 14 with gap S interposed between motor 119 and second substrate 16. Gap S is desirably larger than a plate thickness of second substrate 16. Motor 119, which is connected to first substrate 14 without being in contact with second substrate 16, can be positioned so as not to be affected by a position error of second hole 16a. In addition, in the brazing operation, gap S defined by inner periphery 23 of second substrate 16 and outer periphery 21a of motor flange 21 can provide a space for allowing brazing material 20 overflowing from a part between first substrate 14 and second substrate 16 to flow thereinto. That is, phosphor wheel 118 is configured such that, when brazing material 20 of the brazing material layer of second substrate 16 overflows in the brazing operation of joining second main surface PS2 to third main surface PS3, overflowing brazing material 20 (excess brazing material 20) flows into gap S and gathers in gap S. This can reduce effects of brazing material 20 on the mounting structure of motor 119.

The plurality of heat dissipation fins 17 are disposed on fourth main surface PS4 of second substrate 16. The plurality of heat dissipation fins 17 are integrated with second substrate 16, and are bent in a direction intersecting fourth main surface PS4. Specifically, the plurality of heat dissipation fins 17 are formed by cutting and raising second substrate 16. Each of the plurality of heat dissipation fins 17 is a plate-shaped member formed in the direction intersecting fourth main surface PS4. In the present exemplary embodiment, each of the plurality of heat dissipation fins 17 is formed of a substantially rectangular plate-shaped member extending in a direction perpendicular to fourth main surface PS4. In addition, the plurality of heat dissipation fins 17 are disposed at equal intervals inside the outer periphery of second substrate 16.

The plurality of heat dissipation fins 17 are formed by cutting and raising second substrate 16, and thus rectangular openings 17a are provided at positions adjacent to the plurality of heat dissipation fins 17. Second main surface PS2 of first substrate 14 is exposed from openings 17a.

Due to second substrate 16 being rotated together with first substrate 14 by the rotation of motor 119, the plurality of heat dissipation fins 17 generate wind and dissipate heat generated in phosphor ring 15. Specifically, the heat generated in phosphor ring 15 is conducted to second substrate 16 through first substrate 14. The plurality of heat dissipation fins 17 dissipate the heat generated in phosphor ring 15 by dissipating the heat of second substrate 16 by the wind.

Figure 7:
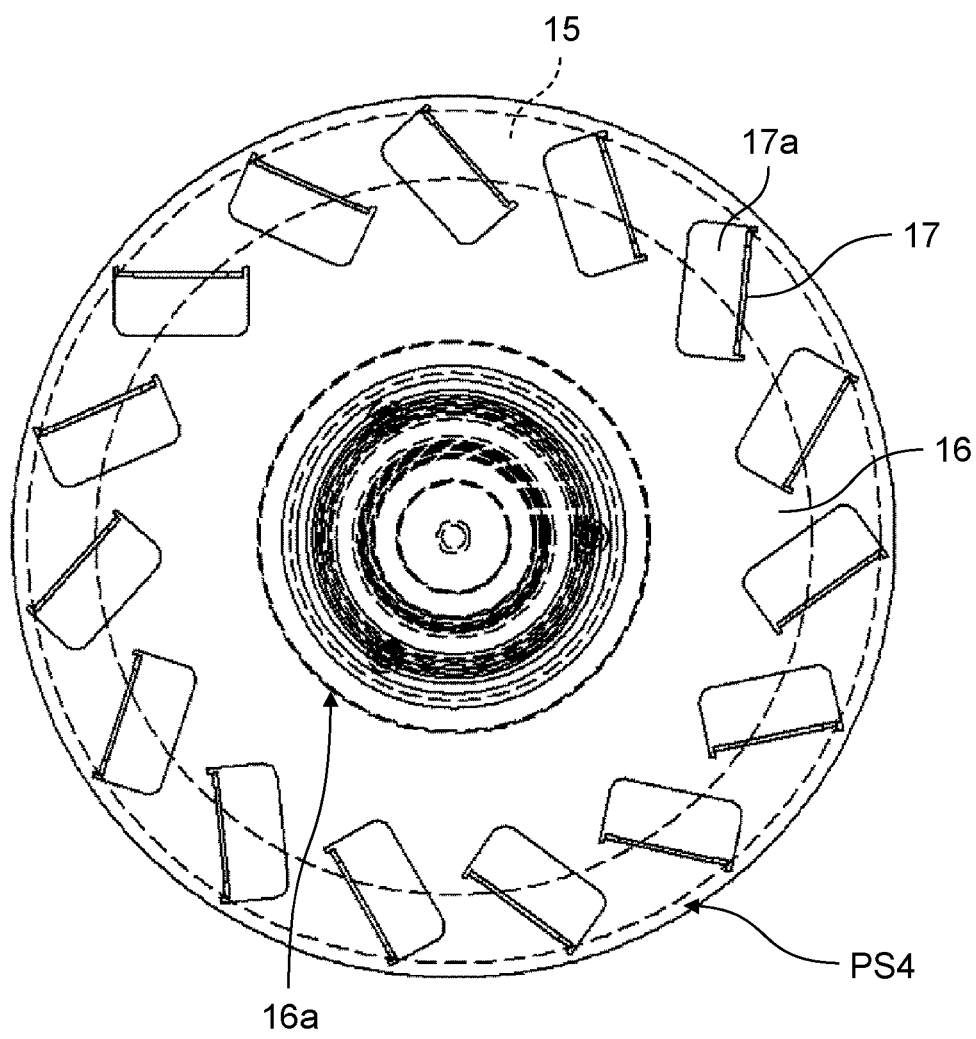
FIG. 7 is a schematic transparent view of the phosphor wheel as viewed from the second substrate side.

FIG. 7 is a schematic transparent view of phosphor wheel 118 as viewed from second substrate 16 side. As illustrated in FIG. 7, the plurality of heat dissipation fins 17 are disposed at positions at least partially overlapping phosphor ring 15 when viewed from fourth main surface PS4 side of second substrate 16. Specifically, when viewed from fourth main surface PS4 side, the plurality of heat dissipation fins 17 are annularly disposed along the outer periphery of second substrate 16. Thus, the heat generated from phosphor ring 15 is easily dissipated. Specifically, the heat generated from phosphor ring 15 is transferred to the plurality of heat dissipation fins 17 while the temperature is high, and a temperature difference between air as a refrigerant and the plurality of heat dissipation fins 17 is increased, thereby improving heat dissipation performance.

Furthermore, when viewed from fourth main surface PS4 side, the plurality of openings 17a are disposed at positions overlapping phosphor ring 15. Thus, second main surface PS2 of first substrate 14, which is opposite to first main surface PS1 where phosphor ring 15 is located, is exposed from the plurality of openings 17a. The heat generated in phosphor ring 15 can be dissipated from second main surface PS2 of first substrate 14 exposed from the plurality of openings 17a. Thus, the heat dissipation performance can be improved as compared with the part where the second substrate 16 exists.

First substrate 14 and second substrate 16 are joined by brazing. Specifically, second main surface PS2 of first substrate 14 and third main surface PS3 of second substrate 16 are joined by brazing. The term "brazing" means that a plurality of members are joined by melting a brazing material having a melting point lower than that of a member to be joined and using the molten brazing material as an adhesive. As described above, because first substrate 14 and second substrate 16 are brazed, when first substrate 14 is rotated by motor 119, second substrate 16 is also rotated.

Second main surface PS2 of first substrate 14 and third main surface PS3 of second substrate 16 are joined by brazing material 20. As brazing material 20, a metal material is used having a high thermal conductivity and having a melting point lower than that of the metal materials each constituting first substrate 14 and second substrate 16. As brazing material 20, an AL—Si alloy or the like can be used. Note that, a clad material is defined as a brazing sheet by JIS Z 3263: 2002, for example.

At least one of first substrate 14 and second substrate 16 may be formed of the clad material. The clad material includes a base material and a brazing material layer. The base material is made of a metal material and has a plate shape. The brazing material layer is disposed on at least one of main surfaces of the base material. In the present exemplary embodiment, second substrate 16 is formed of the clad material. Specifically, second substrate 16 has third main surface PS3, fourth main surface PS4 opposite to third main surface PS3, a base material made of a metal material, and a brazing material layer disposed on third main surface PS3.

On condition that second substrate 16 is formed of a clad material having a brazing material layer on a surface of a base material and having a thickness reduced by rolling, first substrate 14 and second substrate 16 are bonded by pressure bonding, heated in a furnace, and thus can be easily brazed.

In this manner, first substrate 14 and second substrate 16 are brazed with brazing material 20. Thus, heat is easily conducted from first substrate 14 to second substrate 16 via brazing material 20, so that heat dissipation performance can be improved.

In the present exemplary embodiment, first substrate 14 has a circular shape when viewed from first main surface PS1 side, second substrate 16 has a circular shape when viewed from fourth main surface PS4 side, and outer diameter D1 of first substrate 14 is equal to outer diameter D3 of second substrate 16. When first substrate 14 and second substrate 16 are brazed, first substrate 14 and second substrate 16 are disposed such that the outer periphery of first substrate 14 and the outer periphery of second substrate 16 overlap each other when viewed from first main surface PS1 side. Thus, first substrate 14 and second substrate 16 can be easily centered. Specifically, in the brazing operation, when viewed from first main surface PS1 side of first substrate 14, a state in which the center of first substrate 14 and the center of second substrate 16 overlap each other can be easily achieved.

Figure 8:
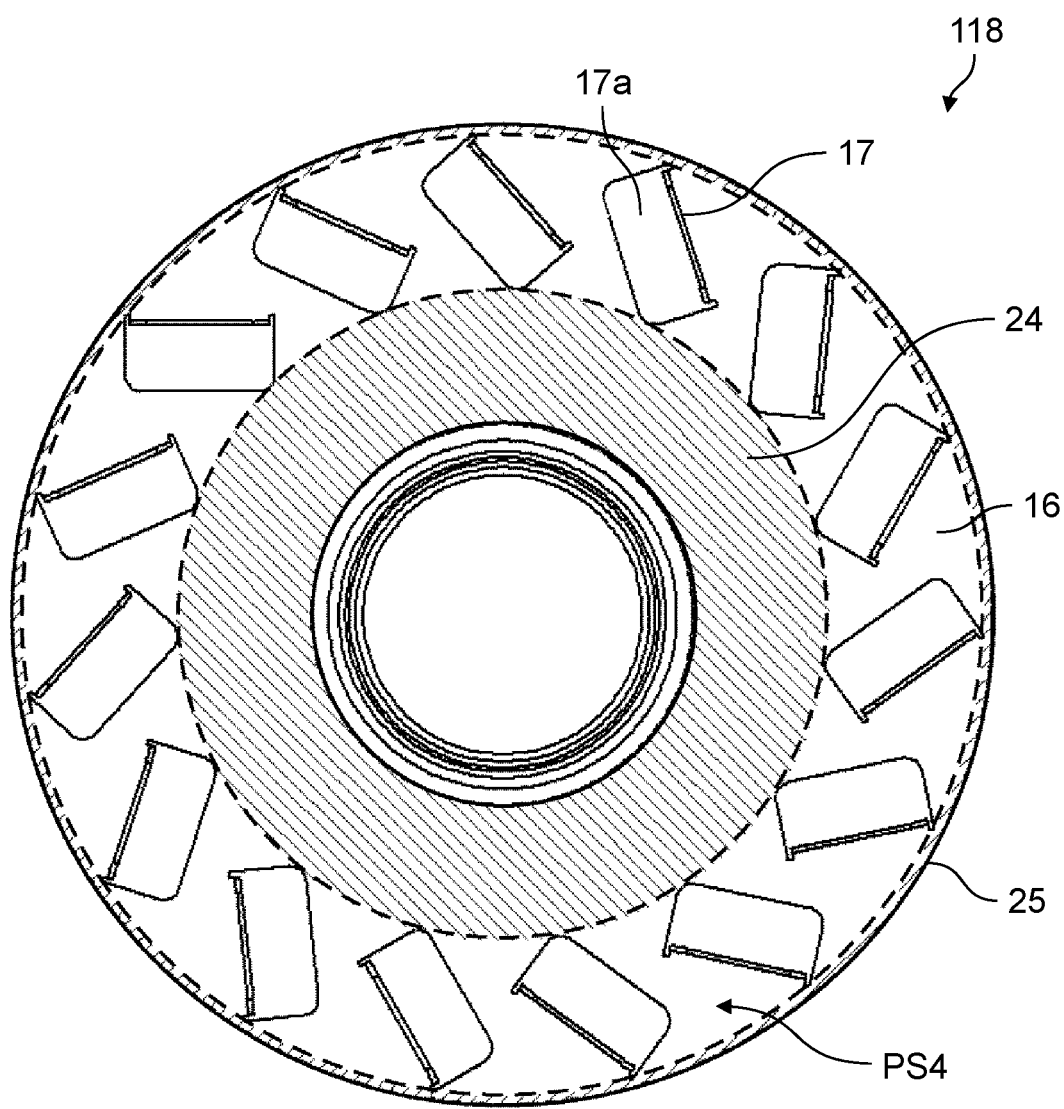
FIG. 8 is a schematic view illustrating a configuration of the phosphor wheel on the second substrate side.

FIG. 8 is a schematic view illustrating a configuration of phosphor wheel 118 on second substrate 16 side. In FIG. 8, for ease of explanation, first annular flat part 24 and second annular flat part 25 are indicated by diagonal hatching. Second substrate 16 has first annular flat part 24 and second annular flat part 25.

First annular flat part 24 is disposed inside the plurality of heat dissipation fins 17 when viewed from fourth main surface PS4 side. First annular flat part 24 has a continuous flat annular shape when viewed from fourth main surface PS4 side. Here, the term "continuous" means uninterrupted and continuously extension. When viewed from fourth main surface PS4 side, first annular flat part 24 is disposed inside the innermost part of the plurality of heat dissipation fins 17 in a radial direction of second substrate 16.

Second annular flat part 25 is disposed outside the plurality of heat dissipation fins 17 when viewed from fourth main surface PS4 side. When viewed from fourth main surface PS4 side, second annular flat part 25 has a continuous flat annular shape and is disposed along the outer periphery of second substrate 16. When viewed from fourth main surface PS4 side, second annular flat part 25 is disposed outside the outermost part of the plurality of heat dissipation fins 17 in the radial direction of second substrate 16. When viewed from fourth main surface PS4 side, second annular flat part 25 has an inner diameter larger than an outer diameter of first annular flat part 24. Second annular flat part 25 has an outer diameter equal to the outer diameter of second substrate 16.

As described above, second substrate 16 has first annular flat part 24 and second annular flat part 25, and the plurality of heat dissipation fins 17 are disposed between first annular flat part 24 and second annular flat part 25. This can provide greater rigidity in second substrate 16, and reduce lifting of the plurality of heat dissipation fins 17 from second substrate 16.

[1-3. Advantageous Effects]

Phosphor wheel 118 of the present disclosure includes first substrate 14, phosphor ring 15, second substrate 16, and the plurality of heat dissipation fins 17. First substrate 14 has first main surface PS1 and second main surface PS2 opposite to first main surface PS1, and is made of the metal material. Phosphor ring 15 is provided on first main surface PS1 of first substrate 14. Second substrate 16 has third main surface PS3 disposed on second main surface PS2 of first substrate 14, and fourth main surface PS4 opposite to third main surface PS3, and is made of the metal material. The plurality of heat dissipation fins 17 are disposed on fourth main surface PS4 of second substrate 16. Second main surface PS2 of first substrate 14 and third main surface PS3 of second substrate 16 are joined by brazing.

This configuration achieves improved cooling performance inexpensively. Specifically, joining first substrate 14 and second substrate 16 by brazing can improve thermal conductivity between first substrate 14 and second substrate 16. As a result, because the heat dissipation performance can be improved, the cooling performance can be improved. In addition, brazing can be performed relatively easily and inexpensively.

First substrate 14 has the circular shape when viewed from first main surface PS1 side. Second substrate 16 has the circular shape when viewed from fourth main surface PS4 side. Outer diameter D1 of first substrate 14 is equal to outer diameter D3 of second substrate 16. When viewed from first main surface PS1 side of first substrate 14, the outer periphery of first substrate 14 overlaps the outer periphery of second substrate 16. This configuration facilitates positioning of first substrate 14 and second substrate 16 in the brazing operation, and centering of first substrate 14 and second substrate 16.

Phosphor wheel 118 further includes motor 119 mounted on first substrate 14. When viewed from first main surface PS1 side of first substrate 14, first substrate 14 has, at its center, first hole 14a into which the motor is fitted. When viewed from fourth main surface PS4 side of second substrate 16, second substrate 16 has, at its center, second hole 16a larger than first hole 14a. This configuration allows motor 119 to be mounted on first substrate 14 without being in contact with second substrate 16. Thus, the mounting structure is not affected, for example, by a brazed state between the substrates. By minimizing a factor such as inclination with respect to the phosphor, stable rotation without gate turning or the like is achieved. This maintains a positional relationship between an optical member and the phosphor, and optical characteristics can be stabilized.

The plurality of heat dissipation fins 17 are disposed at positions at least partially overlapping phosphor ring 15 when viewed from fourth main surface PS4 side of second substrate 16. This configuration can reduce a distance for heat transfer between phosphor ring 15 and the plurality of heat dissipation fins 17, so that heat dissipation performance can be further improved. Thus, cooling performance can be improved.

Second substrate 16 has first annular flat part 24 and second annular flat part 25. First annular flat part 24 is disposed inside the plurality of heat dissipation fins 17 when viewed from fourth main surface PS4 side. Second annular flat part 25 is disposed outside the plurality of heat dissipation fins 17 when viewed from fourth main surface PS4 side. First annular flat part 24 has the continuous flat annular shape. Second annular flat part 25 has the continuous flat annular shape, and is disposed along the outer periphery of second substrate 16. This configuration can increase rigidity of second substrate 16, and thus can reduce lifting of the plurality of heat dissipation fins 17.

The plurality of heat dissipation fins 17 are integrated with second substrate 16, and are bent in the direction intersecting fourth main surface PS4. This configuration allows heat to be easily transferred from second substrate 16 to the plurality of heat dissipation fins 17, and achieves further improved heat dissipation performance.

At least one of first substrate 14 and second substrate 16 is formed of the clad material. The clad material includes the base material and the brazing material layer. The base material is made of the metal material and has the plate shape. The brazing material layer is disposed on at least one of main surfaces of the base material. This configuration facilitates brazing. For example, first substrate 14 and second substrate 16 are bonded by pressure bonding, heated in a furnace, and thus can be brazed. In addition, second substrate 16 involves no mounting of motor 119 and no fixation of phosphor ring 15 unlike first substrate 14. Thus, there is little concern about performance influence. Consequently, second substrate 16 is preferably formed of the clad material.

The metal material constituting first substrate 14 and the metal material constituting second substrate 16 are equal in thermal expansion coefficient to each other. Preferably, the metal material constituting first substrate 14 is the same as the metal material constituting second substrate 16. This configuration achieves improved heat dissipation performance, and further improved cooling performance. In addition, even when a temperature in the brazing operation is different from an actual operation temperature, occurrence of warpage, cracks, and the like can be reduced.

Light source device 200 includes phosphor wheel 118 described above. This configuration allows light source device 200 to have an effect similar to the effect of phosphor wheel 118 described above.

Projection image display device 100 includes light source device 200 having phosphor wheel 118 described above. This configuration allows projection image display device 100 to have an effect similar to the effect of phosphor wheel 118 described above.

Note that in the first exemplary embodiment, an example of each of light source device 200 and illumination optical system 300 has been described, but the present disclosure is not limited thereto. For example, light source device 200 and illumination optical system 300 may include additional elements and/or alternative elements, or may not include some elements.

In the first exemplary embodiment described above, by way of example, phosphor ring 15 has an annular shape. However, the present disclosure is not limited thereto. For example, phosphor ring 15 may be partially missing.

In the first exemplary embodiment described above, by way of example, the plurality of heat dissipation fins 17 are formed by cutting and raising second substrate 16. However, the present disclosure is not limited thereto. For example, the plurality of heat dissipation fins 17 may be separate members from second substrate 16. In this case, no openings 17a may be provided in second substrate 16.

Figure 9:
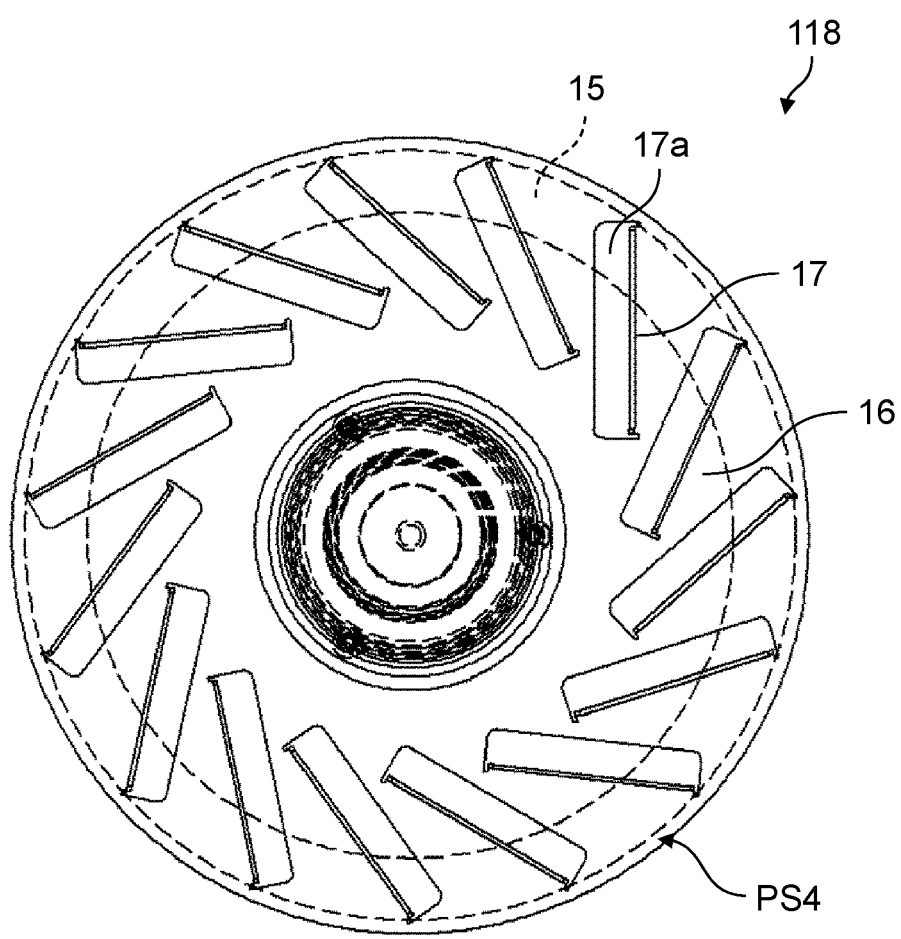
FIG. 9 is a schematic transparent view of a phosphor wheel according to a modification as viewed from the second substrate side.
Figure 10:
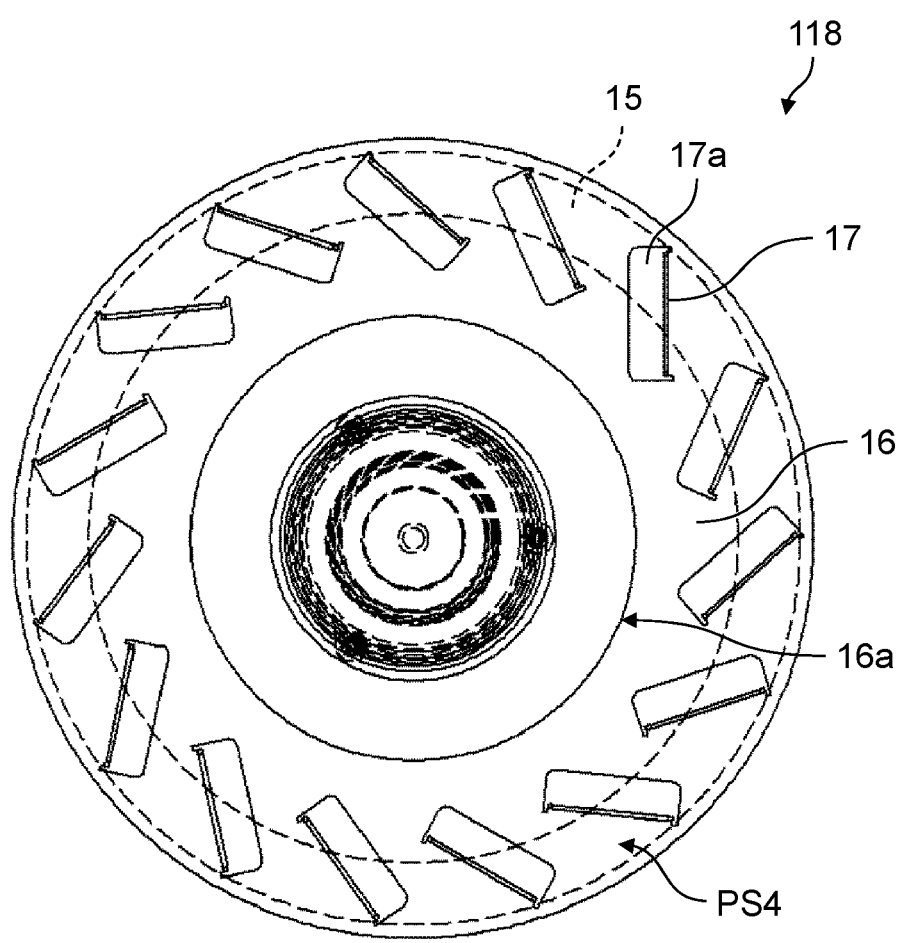
FIG. 10 is a schematic transparent view of the phosphor wheel according to the modification as viewed from the second substrate side.

In the first exemplary embodiment, the shape and the arrangement of the plurality of heat dissipation fins 17 have been described based on the examples illustrated in FIG. 7. However, the present disclosure is not limited thereto. FIGS. 9 and 10 are each a schematic transparent view of phosphor wheel 118 according to a modification as viewed from second substrate 16 side. As illustrated in FIG. 9, the plurality of heat dissipation fins 17 may be increased in length. Alternatively, as illustrated in FIG. 10, the plurality of heat dissipation fins 17 may be disposed away from the center of second substrate 16. In this case, the diameter of second hole 16a may be further increased. Thus, a rotational load can be reduced.

Figure 11A:
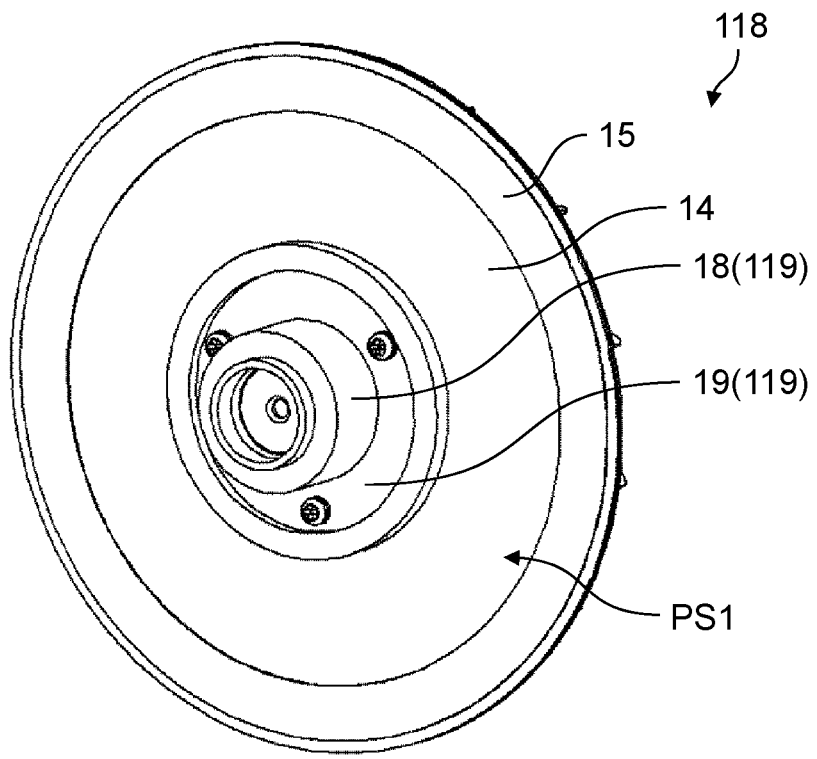
FIG. 11A is a schematic view for describing a mounting structure of the first substrate and a motor.
Figure 11B:
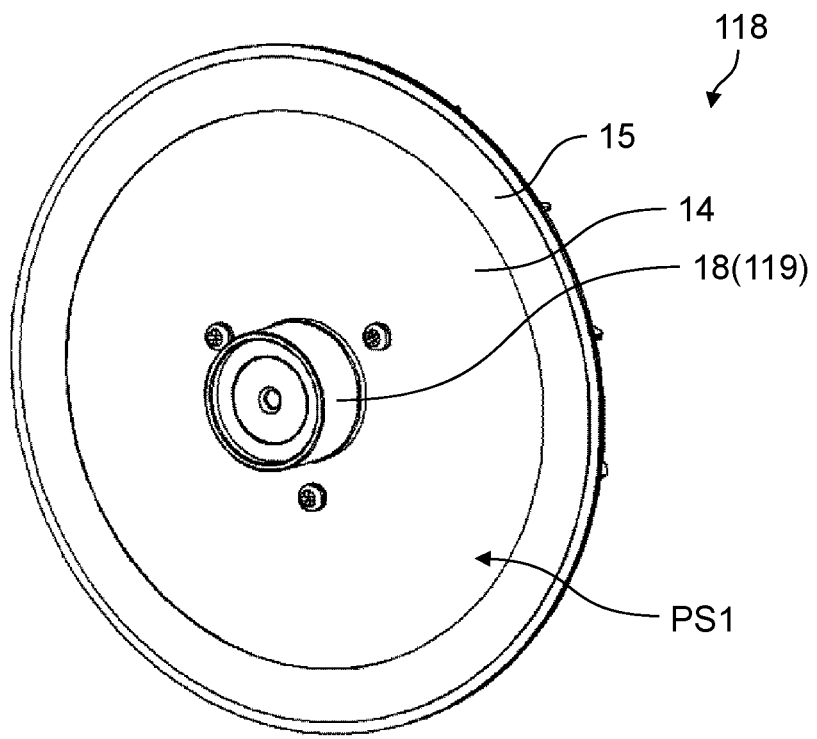
FIG. 11B is a schematic view for describing a mounting structure of the first substrate and the motor.

In the first exemplary embodiment described above, by way of example, motor 119 is fixed to first substrate 14 by fastening fixing flange 19 and motor flange 21 using the screw. However, the present disclosure is not limited thereto. For example, as illustrated in FIG. 11A, motor 119 may have increased length in a thrust direction thereof, and a degree of freedom in setting an adjustment surface for balance adjustment may be increased. Alternatively, as illustrated in FIG. 11B, motor 119 may be directly fixed to first substrate 14 without using a fixing flange.

In the first exemplary embodiment described above, projection image display device 100 has the configuration in which the three DMDs are used, but the present disclosure is not limited thereto. Projection image display device 100 may have a configuration in which three liquid crystal panels are used. As for the configuration with necessity to continuously obtain fluorescent light, it is well known to those skilled in the art that other configurations are also common techniques. In addition, in a one-chip system in which color light is sequentially displayed at a high speed by one DMD to obtain color display, it is necessary to intermittently obtain fluorescent light. Although not described in detail herein, when the wavelength of blue light is shared with the excitation light, an opening window may be partially provided in the phosphor part of phosphor wheel 118 to separately provide the optical path of blue light. In this case, in the content of the present disclosure, the method can be applied as it is as long as a hole penetrating phosphor ring 15, first substrate 14, and second substrate 16 is provided. In addition, in a case where the opening is large, the interval from the phosphor to the outer periphery may be increased to improve the intensity.

As described above, the exemplary embodiment has been described to exemplify the techniques in the present disclosure. The accompanying drawings and the detailed description have been presented for this purpose. Accordingly, in order to exemplify the techniques described above, components illustrated or described in the accompanying drawings and the detailed description may not only include components that are essential for solving the problems, but may also include components that are not essential for solving the problems. For this reason, it should not be immediately construed that those non-essential components are essential only based on the fact that those non-essential components are illustrated in the accompanying drawings or described in the detailed description.

Furthermore, the above-described exemplary embodiment is intended to exemplify the techniques in the present disclosure, and thus various changes, replacements, additions, omissions, and the like can be made to the exemplary embodiment within the scope of the claims or equivalents of the claims.

Overview of Exemplary Embodiment (1) A phosphor wheel according to the present disclosure includes: a first substrate having a first main surface and a second main surface opposite to the first main surface, the first substrate including a metal material; a phosphor ring provided on the first main surface of the first substrate; a second substrate having a third main surface and a fourth main surface, the third main surface being disposed on the second main surface of the first substrate, the fourth main surface being opposite to the third main surface, the second substrate including a metal material; and a plurality of heat dissipation fins disposed on the fourth main surface of the second substrate. The second main surface of the first substrate and the third main surface of the second substrate are joined by brazing.

(2) In the phosphor wheel according to (1), the first substrate may have a circular shape when viewed from a first main surface side, the second substrate may have a circular shape when viewed from a fourth main surface side, the first substrate and the second substrate may be equal in outer diameter to each other, and the first substrate may have an outer periphery that overlaps an outer periphery of the second substrate when viewed from the first main surface side of the first substrate.

(3) The phosphor wheel according to (1) or (2) may further include a motor mounted on the first substrate, the first substrate may have a first hole into which the motor is fitted, the first hole being provided at a center of the first substrate when viewed from the first main surface side of the first substrate, and the second substrate may have a second hole larger than the first hole, the second hole being provided at a center of the second substrate when viewed from the fourth main surface side of the second substrate.

(4) In the phosphor wheel according to any one of (1) to (3), the plurality of heat dissipation fins may be disposed at positions at least partially overlapping the phosphor ring when viewed from the fourth main surface side of the second substrate.

(5) In the phosphor wheel according to any one of (1) to (4), when viewed from the fourth main surface side, the second substrate may include: a first annular flat part disposed inside the plurality of heat dissipation fins; and a second annular flat part disposed outside the plurality of heat dissipation fins, the first annular flat part may have a continuous flat annular shape, and the second annular flat part may have a continuous flat annular shape and may be disposed along the outer periphery of the second substrate.

(6) In the phosphor wheel according to any one of (1) to (5), the plurality of heat dissipation fins may be integrated with the second substrate, and may be bent in a direction intersecting the fourth main surface.

(7) In the phosphor wheel according to any one of (1) to (6), at least one of the first substrate and the second substrate may be formed of a clad material, and the clad material may include a base material including a metal material and having a plate shape, and a brazing material layer disposed on at least one of main surfaces of the base material.

(8) In the phosphor wheel according to (7), the second substrate may be formed of the clad material.

(9) In the phosphor wheel according to any one of (1) to (8), the metal material constituting the first substrate and the metal material constituting the second substrate may be equal in thermal expansion coefficient to each other.

(10) In the phosphor wheel according to any one of (1) to (9), the metal material constituting the first substrate may be same as the metal material constituting the second substrate.

(11) A light source device according to the present disclosure includes the phosphor wheel according to any one of (1) to (10),

(12) A projection image display device according to the present disclosure includes the light source device according to (11).

The present disclosure is applicable to a phosphor wheel, a light source device, and a projection image display device.

What is claimed is:
1. A phosphor wheel comprising:
a first substrate having a first main surface and a second main surface, the second main surface being opposite to the first main surface, the first substrate including a metal material;
a phosphor ring provided on the first main surface of the first substrate;
a second substrate having a third main surface and a fourth main surface, the fourth main surface being opposite to the third main surface, the third main surface being located between the second main surface and the fourth main surface, the second substrate including a metal material;

a plurality of heat dissipation fins disposed on the fourth main surface of the second substrate; and a motor mounted on the first substrate, wherein the second main surface of the first substrate and the third main surface of the second substrate are joined by brazing, the first substrate has a first hole into which the motor is fitted, the first hole being provided at a center of the first substrate when viewed from a first main surface side, the second substrate has a second hole larger than the first hole, the second hole being provided at a center of the second substrate when viewed from a fourth main surface side, and the motor is located inside the second hole, and is mounted on the first substrate with a gap interposed between the motor and the second substrate.

2. The phosphor wheel according to claim 1, wherein the first substrate has a circular shape when viewed from the first main surface side, the second substrate has a circular shape when viewed from the fourth main surface side, the first substrate is equal in outer diameter to the second substrate, and the first substrate has an outer periphery that overlaps an outer periphery of the second substrate when viewed from the first main surface side.

3. The phosphor wheel according to claim 1, wherein at least some of the plurality of heat dissipation fins are disposed at positions overlapping the phosphor ring when viewed from the fourth main surface side.

4. The phosphor wheel according to claim 1, wherein when viewed from the fourth main surface side, the second substrate includes:

a first annular flat part disposed inside the plurality of heat dissipation fins; and a second annular flat part disposed outside the plurality of heat dissipation fins, the first annular flat part has a continuous flat annular shape, and the second annular flat part has a continuous flat annular shape and is disposed along an outer periphery of the second substrate.

5. The phosphor wheel according to claim 1, wherein the plurality of heat dissipation fins are integrated with the second substrate, and are bent in a direction intersecting the fourth main surface.

6. The phosphor wheel according to claim 1, wherein at least one of the first substrate and the second substrate is formed of a clad material, and the clad material includes a base material including a metal material and having a plate shape, and a brazing material layer disposed on at least one of main surfaces of the base material.

7. The phosphor wheel according to claim 6, wherein the second substrate is formed of the clad material.

8. The phosphor wheel according to claim 7, wherein the phosphor wheel is configured to allow a part of a brazing material of the brazing material layer to gather in the gap when the second main surface is brazed to the third main surface.

9. The phosphor wheel according to claim 6, wherein the brazing material layer is located between the second main surface and the third main surface.

10. The phosphor wheel according to claim 1, wherein the metal material of the first substrate is equal in thermal expansion coefficient to the metal material of the second substrate.

11. The phosphor wheel according to claim 1, wherein the metal material of the first substrate is same as the metal material of the second substrate.

12. A light source device comprising the phosphor wheel according to claim 1.

13. A projection image display device comprising the light source device according to claim 12.

14. A phosphor wheel comprising:

a first substrate having a first main surface and a second main surface, the second main surface being opposite to the first main surface;

a phosphor ring provided on the first main surface of the first substrate;

a second substrate having a third main surface and a fourth main surface, the fourth main surface being opposite to the third main surface, the third main surface being located between the second main surface and the fourth main surface; and a plurality of heat dissipation fins disposed on the fourth main surface of the second substrate, wherein the second main surface of the first substrate and the third main surface of the second substrate are joined by brazing.

15. The phosphor wheel according to claim 14, further comprising:

a motor mounted on the first substrate, wherein the first substrate has a first hole into which the motor is fitted, the first hole being provided at a center of the first substrate when viewed from a first main surface side, the second substrate has a second hole larger than the first hole, the second hole being provided at a center of the second substrate when viewed from a fourth main surface side, and the motor is located inside the second hole, and is mounted on the first substrate with a gap interposed between the motor and the second substrate.

16. The phosphor wheel according to claim 15, wherein the first substrate has a circular shape when viewed from the first main surface side, the second substrate has a circular shape when viewed from the fourth main surface side, the first substrate is equal in outer diameter to the second substrate, and the first substrate has an outer periphery that overlaps an outer periphery of the second substrate when viewed from the first main surface side.

17. The phosphor wheel according to claim 15, wherein at least some of the plurality of heat dissipation fins are disposed at positions overlapping the phosphor ring when viewed from the fourth main surface side.

18. The phosphor wheel according to claim 15, wherein when viewed from the fourth main surface side, the second substrate includes:

a first annular flat part disposed inside the plurality of heat dissipation fins; and a second annular flat part disposed outside the plurality of heat dissipation fins, the first annular flat part has a continuous flat annular shape, and the second annular flat part has a continuous flat annular shape and is disposed along an outer periphery of the second substrate.

19. The phosphor wheel according to claim 15, wherein
at least one of the first substrate and the second substrate is formed of a clad material, and
the clad material includes
a base material including a metal material and having a plate shape, and
a brazing material layer disposed on at least one of main surfaces of the base material.

20. The phosphor wheel according to claim 19, wherein the second substrate is formed of the clad material.

21. The phosphor wheel according to claim 20, wherein the phosphor wheel is configured to allow a part of a brazing material of the brazing material layer to gather in the gap when the second main surface is brazed to the third main surface.

22. The phosphor wheel according to claim 19, wherein the brazing material layer is located between the second main surface and the third main surface.

23. The phosphor wheel according to claim 14, wherein the plurality of heat dissipation fins are integrated with the second substrate, and are bent in a direction intersecting the fourth main surface.

24. A light source device comprising the phosphor wheel according to claim 14.

25. A projection image display device comprising the light source device according to claim 24.

* * * * *